United States Patent [19]

Kassai

[11] Patent Number: 4,632,456
[45] Date of Patent: Dec. 30, 1986

[54] CHILDREN'S AUTOMOBILE-MOUNTED SAFETY SEAT

[75] Inventor: Kenzou Kassai, Osaka, Japan

[73] Assignee: Aprica Kassai Kabushikikaisha, Osaka, Japan

[21] Appl. No.: 733,988

[22] Filed: May 13, 1985

[30] Foreign Application Priority Data

May 28, 1984 [JP] Japan ............................ 59-78984[U]

[51] Int. Cl.[4] ............................................. A47D 1/10
[52] U.S. Cl. .................................. 297/328; 297/216; 297/250; 297/327
[58] Field of Search ............... 297/216, 310, 265, 268, 297/316, 326, 327, 328, 250

[56] References Cited

U.S. PATENT DOCUMENTS

| | | | |
|---|---|---|---|
| 2,143,634 | 1/1939 | Saunders | 297/328 |
| 4,033,622 | 7/1977 | Boudreau | 297/250 |
| 4,040,660 | 8/1977 | Bareki | 297/216 |
| 4,047,755 | 9/1977 | McDonald et al. | 297/216 |
| 4,376,551 | 3/1983 | Cone | 297/250 |
| 4,427,916 | 2/1984 | Hyde et al. | 297/250 |
| 4,456,302 | 6/1984 | Knoedler et al. | 297/250 X |
| 4,500,133 | 2/1985 | Nakao et al. | 297/250 X |
| 4,545,613 | 10/1985 | Martel et al. | 297/327 X |

FOREIGN PATENT DOCUMENTS

| | | | |
|---|---|---|---|
| 0003850 | 9/1979 | European Pat. Off. | 297/250 |
| 1461611 | 12/1966 | France | 297/327 |
| 566461 | 9/1957 | Italy | 297/327 |

Primary Examiner—William E. Lyddane
Assistant Examiner—Laurie K. Crammer
Attorney, Agent, or Firm—W. G. Fasse; D. H. Kane, Jr.

[57] ABSTRACT

A children's automobile-mounted safety seat has a body support with a seat portion (2), a base (3) for rotatably supporting the seat portion (2), and reclining adjustment members (12, 15, 16, 17) for adjusting the angle of inclination of the body support portion (2). A journal shaft (11) connecting the seat portion (2) to the base is positioned in the rear lower region of the seat portion in a cavity or hollow space in the base. Reclining adjustment elements (12, 15, 16, 17) are also positioned below the front lower region of the seat portion (2) in the cavity so that manipulation of the reclining adjustment elements is possible only by reaching through an opening in the base into the cavity. A child sitting on the seat normally cannot reach into the cavity and is thus protected against injury by said reclining adjustment elements.

5 Claims, 6 Drawing Figures

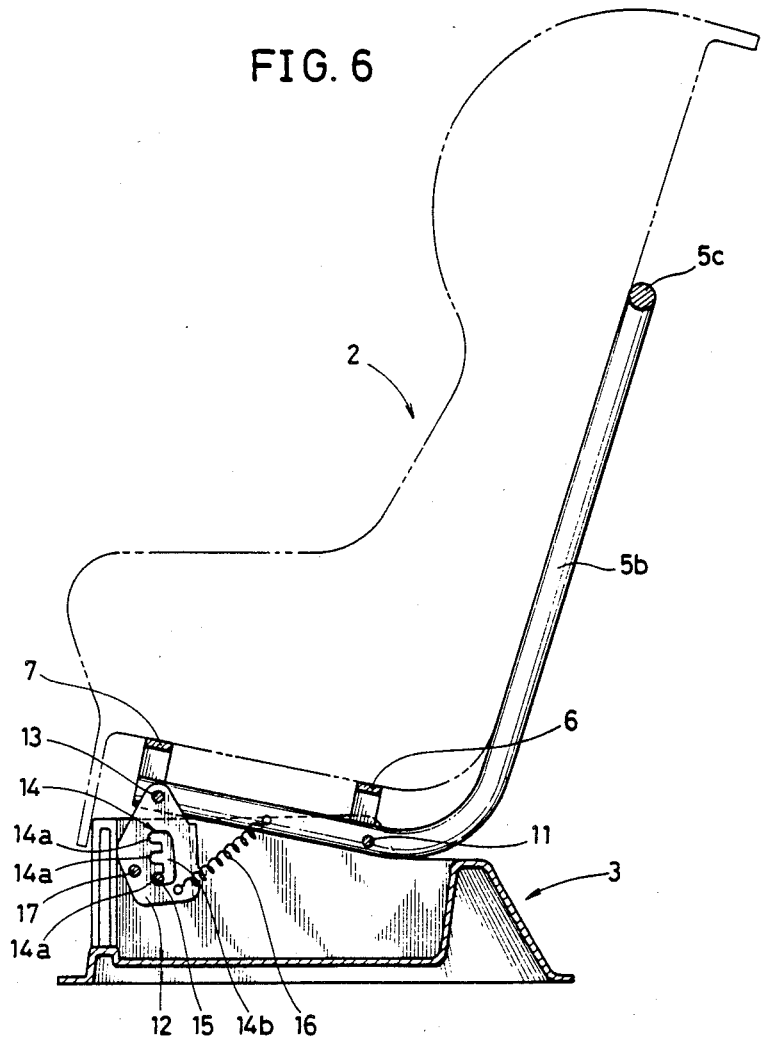

CHILDREN'S AUTOMOBILE-MOUNTED SAFETY SEAT

FIELD OF THE INVENTION

This invention relates to a children's car seat to be attached to a regular seat in a vehicle. The present seat secures the safety of a baby or child placed in an automobile by holding the baby's body in a fixed position at all times.

DESCRIPTION OF THE PRIOR ART

This type of children's automobile-mounted safety seat is firmly fixed on a car seat as by using a belt furnished as part of the car. Thus, the baby or child firmly held in the children's automobile-mounted safety seat will remain in a secured position even when the brakes are applied in an emergency, or when the car travels along a sharp curve, or even in a collision. Thus, the seat is desirable from the standpoint of safety.

SUMMARY OF THE INVENTION

An object of this invention is to provide a children's automobile-mounted safety seat characterized particularly by its reclining mechanism constructed to operate advantageously also when subjected to an impact.

This invention is a children's automobile-mounted safety seat comprising a seat portion, a base for rotatably supporting said seat portion, and reclining adjustment means for adjusting the angle of inclination of the seat portion. The pivotal point for the seat portion is positioned in the rear lower region of said seat portion, while the reclining adjustment means is positioned in the front lower region of the seat portion. This arrangement yields the following effects.

First, it is capable of advantageously operating when subjected to an impact. For example, if the car comes into collision, the impact will give the seat portion of the children's automobile-mounted safety seat a force which turns the seat portion around the pivotal point. In the children's automobile-mounted safety seat of this invention, however, since the pivotal point for the seat portion is positioned in the rear lower region of the seat portion, the center of gravity of the baby or child is located close to the pivotal point, so that the moment due to the impact is relatively small. Therefore, the force by which the impact causes the seat portion to turn is relatively small and the impact force applied to the baby or child is also relatively small.

Secondly, since the reclining adjustment means is positioned in the front lower region of the seat portion, it is, in most cases, not visible from the outside, not maring the appearance of the seat. Further, the front lower region of the seat portion is a place which cannot be seen by the baby or child placed on the seat portion and said region is also out of a baby's reach when the baby is assuming an ordinary posture. Thus, there is no danger of the baby or child getting hurt by getting, for example, a finger caught in the reclining adjustment means.

Thirdly, since the reclining adjustment means is positioned remote from the pivotal point for the seat portion, even if it is subjected to an impact, as from a collision, the impact load will be concentrated on the pivotal point, with not much impact force acting on the reclining adjustment means. Thus, damage to the reclining adjustment means can be minimized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view of a seat portion tilted rearwardly as compared to the state shown in FIG. 5.

DESCRIPTION OF THE PREFERRED EMBODIMENTS

Figure 1:
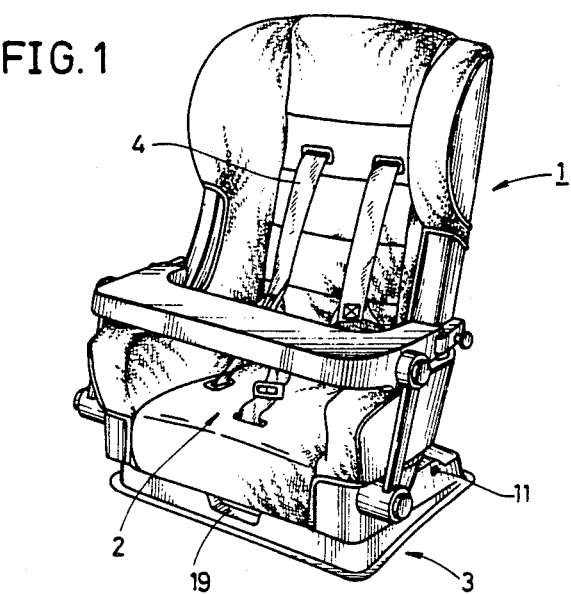
FIG. 1 is a front perspective view of an embodiment of the invention.
Figure 2:
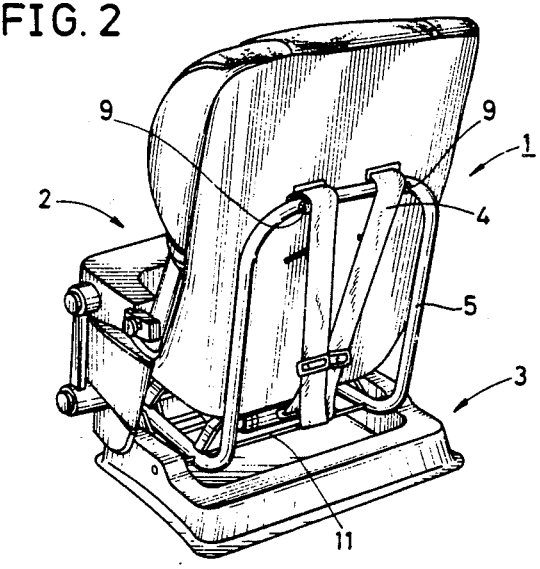
FIG. 2 is a rear perspective view of the embodiment of FIG. 1.

A children's automobile-mounted safety seat 1 shown in FIGS. 1 and 2 will be firmly fixed on a car seat as by using a belt furnished as part of the automobile. This children's automobile-mounted safety seat 1 comprises a seat portion 2, a base 3 for rotatably supporting the seat portion 2, and reclining adjustment means for adjusting the angle of inclination of the seat portion 2. The reclining adjustment means do not appear in the illustration of FIGS. 1 and 2. The baby or child is kept seated on the seat portion 2 when the car is driven, with his body firmly held by a safety belt 4.

Figure 3:
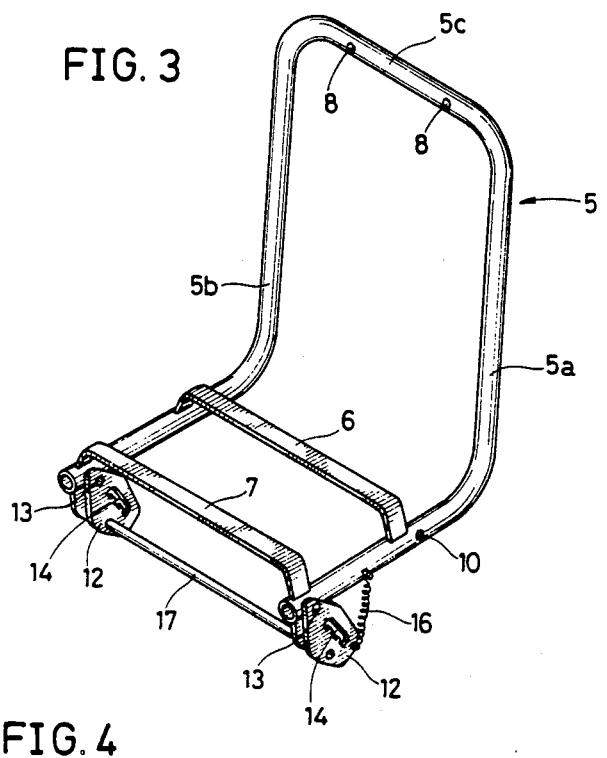
FIG. 3 is a front perspective view of an L-shaped support member shown in FIG. 2.

The seat portion 2 has an L-shaped frame member 5 extending along the bottom and back of said seat portion 2. Referring to FIG. 3, the L-shaped frame member 5 comprises a pair of L-shaped frame sections 5a and 5b, and an upper connecting frame 5c interconnecting the upper ends of said L-shaped frame sections 5a and 5b. The left-hand and right-hand side L-shaped frame sections 5a and 5b are interconnected by two strap plates 6 and 7, which will be fixed to the bottom of the seat portion 2. The upper frame section 5c has two throughgoing holes 8 and is fixed to the back of the seat portion 2 by screws 9 (see FIG. 2) extending through said throughgoing holes 8. The left-hand and right-hand side L-shaped frame sections 5a and 5b have throughgoing holes 10 adjacent their bends. On the other hand, the rear portion of the base 3 shown in FIG. 4 has a journal shaft 11 fixed thereto, which will be inserted in said throughgoing holes 10. The L-shaped frame member 5 and hence the seat portion 2 is thereby installed for rotation around the axis of the journal shaft 11.

Figure 4:
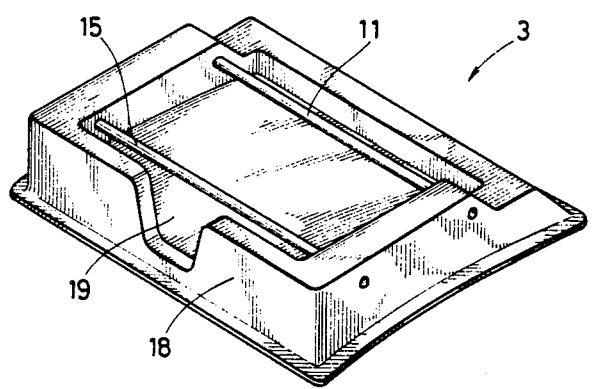
FIG. 4 is a front perspective view of a base shown in FIGS. 1 and 2.
Figure 5:
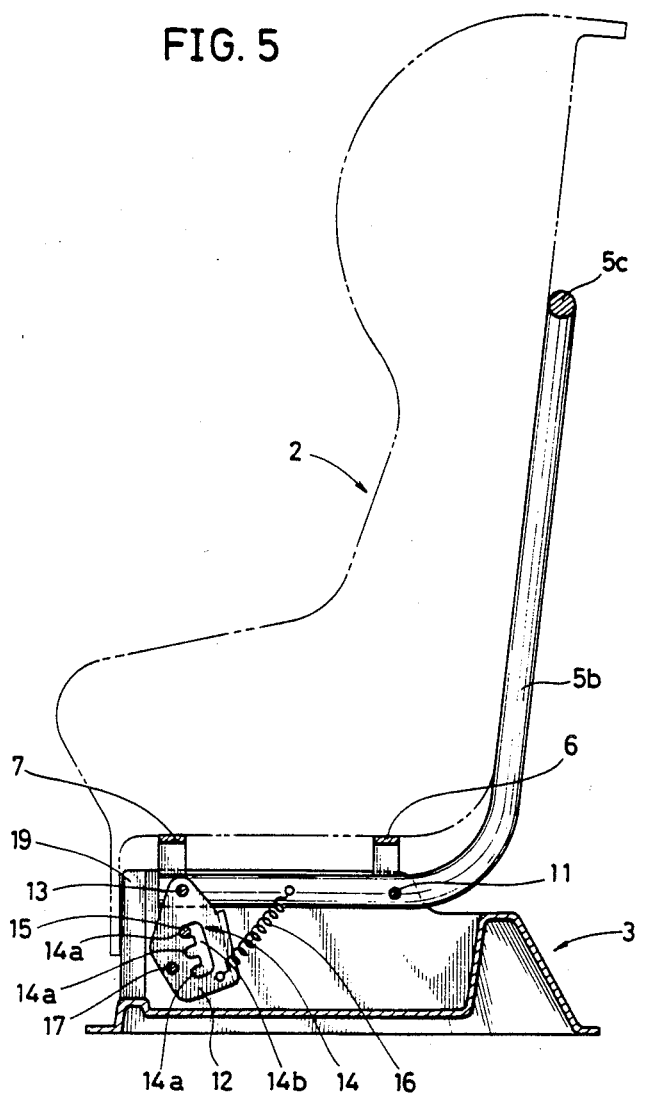
FIG. 5 is a side sectional view of a children's automobile-mounted safety seat, taken through the middle of the embodiment shown in FIGS. 1 and 2.

For convenience's sake, the contour of the seat portion 2 is show in phantom lines in FIGS. 5 and 6. Referring to FIGS. 3 to 6, an adjustment element 12 is rotatably attached to each of the L-shaped frame sections 5a and 5b adjacent the front end thereof by a journal pin 13. The lateral surface of the adjustment element 12 is formed with an adjustment hole 14 comprising a plurality of engagement recesses 14a and an opening guide 14b interconnecting said engagement recesses 14a. On the other hand, an engagement shaft 15 extending through the adjustment holes 14 is attached to the front portion of the base 3. The lower end of the adjustment elements 12 are connected to the L-shaped frame sections 5a and 5b by springs 16. The springs 16 constantly urge the adjustment elements 12 to turn in one direction, whereby engagement recesses 14a engage the engagement shaft 15.

Referring to FIG. 3, the adjustment elements 12 are interconnected by an operating rod 17. The operating rod 17 will be used when it is desired to turn the adjustment elements 12. That is, if the operating rod 17 is gripped by hand and pulled, the pair of adjustment elements 12 disposed on both sides will be simultaneously turned. To facilitate this operation, the front wall 18 of the base 3 is formed with an opening 19, as shown in FIG. 4.

To tilt the seat portion 2 rearwardly from the FIG. 5 state, the following operation will be performed. First, the operating rod 17 is gripped by hand and pulled toward the operation, whereby the adjustment elements 12 are turned clockwise about the journal pins 13 as viewed in the figure, with the result that the engagement shaft 15 is positioned in the opening guide 14b. With this state maintained, the seat portion 2 is tilted rearwardly and the operator releases the operating rod 17, whereupon the adjustment elements 12 are turned counterclockwise by the action of the springs 16 and the engagement shaft 15 engages another one of the engagement recesses 14a as shown in FIG. 6.

In the embodiment described above, the seat portion 2 has an L-shaped frame member 5 and the latter is rotatably attached to the base 3. As a variation, however, the seat portion 2 may be rotatably attached directly to the base 3 without using the L-shaped frame member 5.

Further, in the embodiment described above, the reclining adjustment means for adjusting the angle of inclination of the seat portion 2 uses the adjustment elements 12, engagement shaft 15, springs 16, and the operating rod 17. However, the invention is not limited to such arrangement, and other reclining adjustment means may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A children's automobile-mounted safety seat comprising body support means including a seat portion (2) and a backrest portion constructed as an integral unit for supporting a child's body, base means (3) for rotatably supporting said seat portion (2) of said body support means, said base means including wall means enclosing a hollow space inside said base means, journal means (10, 11) for said seat portion (2) positioned in a rear lower region of said seat portion and in a rear region of said hollow space inside said base means, and reclining adjustment means (12, 15, 16, 17) positioned below a front lower region of said seat portion (2) and in a front zone of said hollow space inside said base means, whereby said reclining adjustment means are enclosed by said seat portion and by said base to be substantially out of reach to a child sitting in said safety seat, said base means comprising a front section providing an access (19) into said hollow space for manipulating said reclining adjustment means.

2. The safety seat of claim 1, wherein said body support means comprise an L-shaped frame member (5) extending along a bottom and back of said body support means, said journal means including a journal shaft (11) secured to said base in said hollow space for rotatably attaching said L-shaped frame member (5) to said base means (3).

3. The safety seat of claim 2, wherein said reclining adjustment means comprise an adjustment element (12) rotatably attached to said L-shaped frame member (5) adjacent the front end thereof, said adjustment element having a lateral wall with an adjustment hole (14) including a plurality of engagement recesses (14a) and an opening guide (14b) interconnecting said engagement recesses, an engagement shaft (15) fixed to said base and extending through said adjustment hole (14), a spring (16) for urging said adjustment element (12) to turn in the direction which causes engagement between said engagement recesses (14a) and said engagement shaft (15), and an operating rod (17) attached to said adjustment element (12) for rotationally operating said adjustment element (12) to change a reclining position of said body support means.

4. The safety seat of claim 1, wherein said base means have a quadrilateral configuration for resting on a car seat.

5. The safety device of claim 3, wherein said front section of said base means comprises a base front wall, and wherein said access is an opening in said base front wall for operating said operating rod (17) to thereby allow a change in a reclining position of said body support means.

* * * * *